US011692921B2

(12) United States Patent
Merrullo et al.

(10) Patent No.: US 11,692,921 B2
(45) Date of Patent: Jul. 4, 2023

(54) RHEOMETER HAVING RESISTANCE HEATER AND COOLING DEVICE

(71) Applicant: TA Instruments-Waters LLC, New Castle, DE (US)

(72) Inventors: Scott Merrullo, Conshohocken, PA (US); Nigel Doe, Newark, DE (US); Peter Foster, Avondale, PA (US)

(73) Assignee: TA INSTRUMENTS-WATERS LLC, New Castle, DE (US)

( * ) Notice: Subject to any disclaimer, the term of this patent is extended or adjusted under 35 U.S.C. 154(b) by 69 days.

(21) Appl. No.: 17/326,950

(22) Filed: May 21, 2021

(65) Prior Publication Data

US 2021/0372908 A1    Dec. 2, 2021

Related U.S. Application Data

(60) Provisional application No. 63/030,577, filed on May 27, 2020.

(51) Int. Cl.
*G01N 11/14* (2006.01)
*G01N 11/00* (2006.01)

(52) U.S. Cl.
CPC ........ *G01N 11/14* (2013.01); *G01N 2011/002* (2013.01)

(58) Field of Classification Search
CPC ........ G01N 11/14; G01N 11/00; G01N 11/16; G01N 11/10; G01N 11/142; G01N 2291/02818; G01N 2011/002; G01N 11/162; G01N 11/165

USPC .......... 73/54.01, 54.02, 54.23, 54.28–54.35, 73/54.39, 54.42, 54.43
See application file for complete search history.

(56) References Cited

U.S. PATENT DOCUMENTS

| 3,182,494 A | * | 5/1965 | Beatty | G01N 11/162 73/54.23 |
| 3,488,992 A | * | 1/1970 | Mehrbrodt | G01N 11/165 374/48 |
| 3,531,996 A | * | 10/1970 | Harris | G01N 11/162 374/48 |

(Continued)

OTHER PUBLICATIONS

International Search Report and Written Opinion in PCT/US2021/033625 dated Aug. 23, 2021.

(Continued)

*Primary Examiner* — David A. Rogers
(74) *Attorney, Agent, or Firm* — Schmeiser, Olsen & Watts LLP; William G. Guerin (57) ABSTRACT

Described are a method and device for controlling a temperature of a sample. The sample may be a rheometer sample. A thermal control system comprising a geometry element, heat conductor element, heater element, cooling device and thermal resistance layer is used. The cooling device may be a Peltier element. The heat conductor element is disposed adjacent to and in thermal communication with the geometry element. The heater element is in thermal contact with the heat conductor element. The thermal resistance layer is disposed between and in thermal contact with an element surface of the heat conductor element and a cooling surface of the cooling device. The heater element is operated to cause heat to flow to the geometry element and (Continued)

the cooling device is operated to cool the cooling surface to a temperature that is less than a temperature of the element surface.

20 Claims, 7 Drawing Sheets

(56) References Cited

U.S. PATENT DOCUMENTS

| | | | | |
|---|---|---|---|---|
| 3,681,980 A * | 8/1972 | Decker | ................... | G01N 3/34 |
| | | | | 374/48 |
| 4,421,424 A * | 12/1983 | Price | ................... | G01N 11/162 |
| | | | | 374/53 |
| 5,520,042 A * | 5/1996 | Garritano | ............. | G01N 11/142 |
| | | | | 73/843 |
| 5,526,693 A * | 6/1996 | Wise | ................... | G01N 11/165 |
| | | | | 73/54.39 |
| 6,240,770 B1 * | 6/2001 | Raffer | ................... | B01L 7/00 |
| | | | | 73/54.23 |
| 6,571,610 B1 | 6/2003 | Raffer | | |
| 6,978,662 B2 * | 12/2005 | Platzek | ................. | G01N 11/14 |
| | | | | 73/54.23 |
| 7,168,299 B2 | 1/2007 | Doe et al. | | |
| 7,444,855 B2 * | 11/2008 | Cottais | ................ | G01N 11/142 |
| | | | | 73/54.39 |
| 7,500,385 B2 * | 3/2009 | Liberatore | ........... | G01N 11/142 |
| | | | | 73/54.23 |
| 7,784,329 B2 * | 8/2010 | Martinoty | .............. | G01N 11/16 |
| | | | | 73/54.39 |
| 8,453,496 B2 * | 6/2013 | Lauger | ................. | G01N 11/142 |
| | | | | 73/54.28 |
| 8,904,852 B2 * | 12/2014 | Wollny | ................ | G01N 11/142 |
| | | | | 73/54.32 |
| 10,436,694 B2 * | 10/2019 | Baek | ...................... | G01N 11/02 |
| 2005/0199044 A1 * | 9/2005 | Doe | ..................... | G01N 11/14 |
| | | | | 73/54.43 |
| 2010/0071443 A1 | 3/2010 | Wrench et al. | | |
| 2014/0311226 A1 * | 10/2014 | Murray | .................... | B01L 7/00 |
| | | | | 219/432 |

OTHER PUBLICATIONS

International Preliminary Report on Patentability in International Application No. PCT/US2021/033625 dated Dec. 8, 2022; 8 pages.

* cited by examiner

PRIOR ART

RHEOMETER HAVING RESISTANCE HEATER AND COOLING DEVICE

RELATED APPLICATION

This application claims the benefit of the earlier filing date of U.S. Provisional Patent Application Ser. No. 63/030,577 filed May 27, 2020 and titled "Rheometer having Resistance Heater and Cooling Device," the entirety of which is incorporated herein by reference.

FIELD OF THE INVENTION

The present disclosure relates generally to a method and device for controlling a temperature of a sample and more particularly to a method and device for rheometers, which are used to characterize materials by measuring material properties such as viscosity, elasticity, shear thinning, yield stress and compliance.

BACKGROUND

Rotary rheometers, viscometers and viscosimeters are used to measure fluid or other properties of materials, such as their viscosity, by rotating, deflecting or oscillating a measuring object in a material, and measuring, for example, the torque required to rotate or deflect or oscillate the object within the material. As used herein, the term "rheometer" means rheometers, viscometers, viscosimeters and similar instruments that are used to measure the properties of fluids or similar materials. Examples of materials that can be measured include liquids, oils, dispersions, suspensions, emulsions, adhesives, biological fluids such as blood, polymers, gels, pastes, slurries, melts, resins, powders and mixtures thereof. Such materials are referred to generically as "fluids" herein. More specific non-limiting examples of materials include asphalt, chocolate, drilling mud, lubricants, oils, greases, photoresists, liquid cements, elastomers, thermoplastics, thermosets and coatings.

As used herein, the term "geometry" means an object configured for physical contact with and thermal engagement with a rheometer sample to enable measurement of temperature-dependent physical properties. The term "geometry element" is used interchangeably herein with the term "geometry." A geometry can have any one of several geometrical shapes, including, for example, cones, discs, vanes, parallel plates, concentric cylinders and double concentric cylinders. Geometries may be made of a variety of different materials, including, but not limited to, stainless steel, anodized aluminum and titanium.

The fluid properties of materials are generally dependent on the temperature of the material. Thus, it is generally important that the temperature of the material being tested is known and is homogeneous. If the temperature of the material is not homogeneous, the accuracy and validity of the measurement may be compromised. Thus, the temperature of the fluid is generally accurately controlled, and is preferably made as homogeneous as possible, for example by using a fluid bath or a Peltier element. A Peltier element operates according to the Peltier thermoelectric effect where an electrical current passes across the junction of two dissimilar metals or semiconductors so that a temperature gradient is formed across the junction. The temperature on one side of the junction increases while the temperature on the side of the junction decreases. Compared to a fluid bath, a Peltier element temperature control system provides a more rapid heating and cooling of the sample and is more economical because it does not require an expensive temperature-controlled fluid circulator.

Peltier elements provide a convenient way to control the sample temperature in a rheometer. The sample temperature is controlled by controlling the electrical current supplied to the Peltier element. The direction of the current determines whether the Peltier element is used to cool or heat the sample. Typically, Peltier elements are placed in thermal contact with a lower geometry to enable sample temperatures that can be greater than or less than ambient temperature. To operate without thermal gradients, Peltier elements can also be used to supply heat to or remove heat from a hood or jacket which transfers heat to or from the upper geometry to achieve a temperature substantially equal to the temperature of the lower geometry.

The use of Peltier elements to both heat and cool the sample limits the operational temperature range of the rheometer instrument due to a maximum operating temperature for the Peltier element. As used herein, a "specified maximum temperature" for a Peltier element refers to a temperature above which the cooling performance of the Peltier elements is expected to degrade at an acceptable rate over time. Degradation may be due to temperature-dependent diffusion processes and/or the melt temperature of solder used in fabrication of the element. Current rheometric temperature control techniques which heat to temperatures above the specified maximum temperature of Peltier elements, such as electrical resistance heaters, are used with less desirable methods of cooling. For example, liquid coolants with temperature controlled by a separate chiller unit may be used or liquid nitrogen may be used; however, disadvantages such as added complexity and cost, reduced cooldown rates and less precision often result.

SUMMARY

In an aspect of the present disclosure, a device to control a temperature of a rheometer sample includes a geometry element, a heat conductor element, a heater element, a cooling device and a thermal resistance layer. The heat conductor element has an element surface and is disposed adjacent to and in thermal communication with the geometry element. The heater element is in thermal contact with the heat conductor element. The cooling device has a cooling surface. The thermal resistance layer is disposed between and in thermal contact with the element surface and the cooling surface.

The heater element may be an electrical resistance heater. The electrical resistance heater may be a cartridge heater. The cooling device may be a Peltier element.

The cooling surface may be a first surface of the cooling device and the device may further include a heat sink having a heat sink surface in thermal contact with a second surface of the cooling device. The heat sink may be a liquid-cooled heat sink.

The heat conductor element may be disposed around at least a portion of the geometry element and may be separated from the geometry element by an air gap.

The heat conductor element and the geometry element may be a unitary element.

The geometry element may be a cup, a bob or a rotor. The geometry element may be a plate configured to be in thermal contact with a rheometer sample. The plate may be a lower measurement plate or an upper measurement plate of a rheometer.

The thermal resistance layer may have a thermal resistance of at least 1 K/W and not exceed 2 K/W. The thermal resistance layer may include a polyimide layer, a polyether ether ketone layer and/or a ceramic layer.

In another aspect of the present disclosure, a method for controlling a sample temperature includes providing a thermal control system that includes a geometry element, a heat conductor element, a cooling device and a thermal resistance layer. The heat conductor element has an element surface and is disposed adjacent to and in thermal communication with the geometry element. The heater element is in thermal contact with the heat conductor element. The cooling device has a cooling surface. The thermal resistance layer is disposed between and in thermal contact with the element surface and the cooling surface. The method further includes operating the heater element to cause heat to flow to the geometry element and operating the cooling device to cool the cooling surface to a temperature that is less than a temperature of the element surface.

The temperature of the element surface may be greater than a specified maximum temperature of the cooling surface. The thermal resistance layer may have a thermal resistance of at least 1 K/W and no more than 2 K/W.

The cooling device may include a Peltier element. Operation of the cooling device to cool the cooling surface may include cooling the cooling surface to a temperature that does not exceed a specified maximum temperature of the cooling surface.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the technology.

DETAILED DESCRIPTION

Reference in the specification to an "example," "embodiment" or "implementation" means that a particular feature, structure or characteristic described in connection with the example, embodiment or implementation is included in at least one embodiment of the teaching. References to a particular example, embodiment or implementation within the specification do not necessarily all refer to the same embodiment.

As used herein, the term "thermal contact" means direct thermal communication between two elements such that there is no intervening third element having a thermal conductivity that is substantially different from the thermal conductivities of the two elements. For example, the two elements may be in direct physical contact with each other. Alternatively, one or more additional elements may be disposed in the thermal path between the two elements; however, such additional elements impose no substantial impediment to the heat flow between the two elements. In this latter case, the one or more intervening elements may be considered as part of one of the other elements in terms of a total thermal resistance provided by the combination of the element and the intervening element.

As used herein, a rheometer sample means any sample material that can be analyzed to determine its rheologic properties such as the flow and deformation characteristics of the sample material. For example, the rheometer sample may be positioned between an upper geometry and a lower geometry of a rheometer. In various examples, a geometry is a thermally conductive element in the shape of a plate, a bob, a vane or a rotor. Bobs, vanes and rotors are used in combination with a cup where the cup is configured to receive and hold a sample and the bob, vane or rotor is immersed in the sample. Solid samples may be held in place by clamps. The terms upper and lower are used to indicate relative position of the geometries (and other elements) within a rheometer instrument.

In brief overview, examples of a device and a method for controlling a temperature of a rheometer sample include use of a thermal control system that includes a geometry element, a heat conductor element, a heater element, a cooling device and a thermal resistance layer disposed between an element surface of the heat conductor element and a cooling surface of the cooling device. The heater element is operated to cause heat to flow to the geometry element through the heat conductor element. The cooling device is operated to cool the cooling surface to a temperature that is less than a temperature of the element surface. Multiple devices may be used in a single measurement instrument. A significant advantage achieved by the devices and methods disclosed herein is an expanded operating temperature range. For example, samples can be tested at significantly greater operating temperatures (e.g., 50° C. greater) without degrading cooling devices implemented as Peltier elements and with little increase in the minimum temperature achievable during cooling (e.g., less than 5° C.). By way of a non-limiting example, a specified maximum temperature for operation of a Peltier element may be 175° C.; however, samples may be tested at temperatures that exceed 200° C.

The present disclosure will now be described in more detail with reference to embodiments thereof as shown in the accompanying drawings. While the present teaching is described in conjunction with various embodiments and examples, it is not intended that the present teaching be limited to such embodiments. On the contrary, the present disclosure encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

Figure 1:
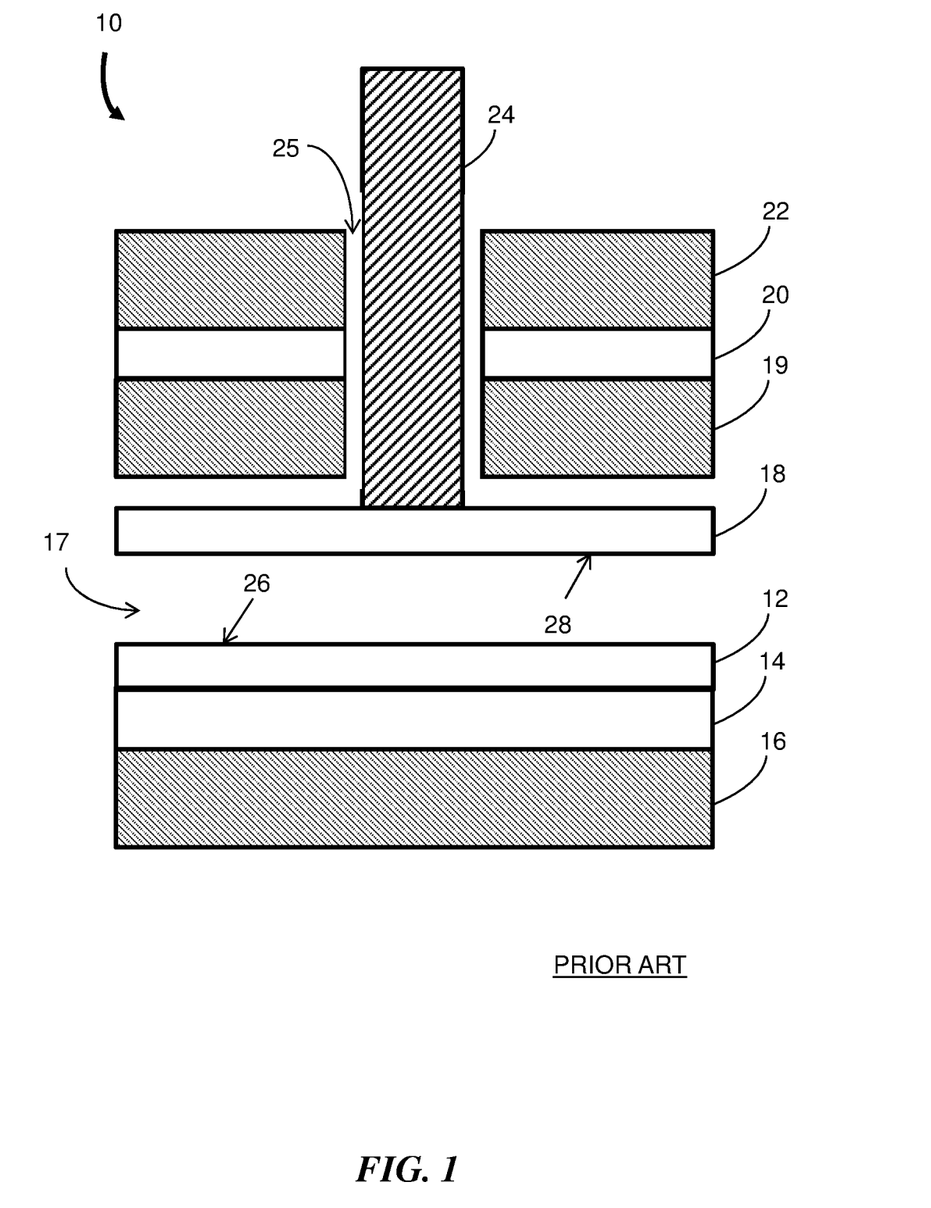
FIG. 1 is a functional block diagram of a prior art rotary rheometer.

FIG. 1 is a functional block diagram of a prior art rotary rheometer 10. The simplified arrangement of components is intended to show functionally how heat is transferred within the rheometer 10 and is not intended to show a specific configuration or convey dimensional information. The rheometer 10 includes a lower geometry 12, a thermal pump 14 and a heat sink 16. The lower geometry 12 is in thermal contact with one side of the thermal pump 14 and an opposite side of the thermal pump 14 is in thermal contact with a surface of the heat sink 16. The rheometer 10 also includes an upper geometry 18, a heat conductor element 19, a thermal pump 20 and a heat sink 22. The heat conductor element 19 has an element surface that is adjacent to and in thermal communication (through an air gap) with the upper geometry 18. The term "heat conductor element" as used herein means any thermally-conductive element, fixture or structure that enables a rapid heat transfer such that the element, fixture or structure has substantially the same temperature throughout and can be used to apply heat to or receive heat from another structure or element via conduction, convection and radiative heat transfer. In some instances, the heat conductor element 19 may include two or more discrete elements, or pieces, which define the total heat flow path for the heat conductor element 19. In practice, the number of thermal pumps 14 and 20 may be greater than shown and one or more heat conductor elements may be disposed between and in thermal contact with each thermal pump 14 or 20 and the associated geometry 12 or 18, respectively.

A rotary shaft 24 is coupled at one end to the upper geometry 18 and near or at the other end to a motor (not shown) such that rotation of the shaft 24 results in rotation of the upper geometry 18. The heat conductor element 19, thermal pump 20 and heat sink 22 are spaced apart from the shaft 24 and upper geometry 18 by an air gap 25 so that the shaft 24 and upper geometry 18 may rotate freely; however, the air gap 25 is sufficiently small for efficient heat transfer across the air gap 25. In a non-limiting example, a nominal 0.5 mm air gap may be used; however, other size air gaps are possible. A larger air gap may be provided, for example, if forced convection is used to provide a flow of hot or cold air over the shaft and geometry. The air gap may be determined, at least in part, from the heat transfer surface area of the geometry and the characteristics of the air flow. In some implementations, another heat conductor element (e.g., a heat spreader) extends upward from the upper geometry 18 and the heat conductor element 19 is shaped to receive and surround the heat spreader without being in direct contact. For example, the heat spreader may have a hollow cylindrical shape that extends upward away from the upper geometry 18. The heat conductor element 19 may be shaped as two concentric hollow cylinders in thermal contact with each other at a top end. The heat spreader is positioned in the gap between the concentric hollow cylinders of the heat conductor element 19. Thus, the heat spreader rotates freely in the gap when the upper geometry 18 rotates about the shaft axis.

An adjustable measurement gap 17 is provided between the upper surface 26 of the lower geometry 12 and the lower surface 28 of the upper geometry 18. As the measurement gap is adjusted, the upper geometry 18, heat conductor element 19, thermal pump 20, heat sink 22 and shaft 24 move in unison upward or downward so that the position of these elements with respect to each other remains unchanged.

During operation, the thermal pumps 14 and 20 operate to transfer heat to or from the lower geometry 12 and the upper geometry 18, respectively. The upper geometry 18 is heated or cooled via a heat flow from or to the heat conductor element 19 across the air gap 25.

In some rheometers, one or more heater elements are provided in thermal communication with the lower and upper geometries 12 and 18. For example, U.S. Pat. No. 6,571,610 discloses a rotary rheometer having a heat pump to heat or cool both lower and upper geometries and further discloses heating elements in both the lower and upper portions of the rheometer that are selectively active for use in minimizing temperature gradients in the sample that might otherwise occur due to a temperature difference between the geometries bases on operation solely with the heat pumps. Regardless of this improvement, the disclosed rheometer and other known rheometers are limited in their operating temperature range with heat pumps that are implemented as Peltier elements. The use of a Peltier element for both heating and cooling samples limits the instrument operating temperature range due to a specified maximum temperature of the Peltier element. For example, the specified maximum temperature may be indicated in product specifications made available by a manufacturer or distributor of the cooling device. Operation above the specified maximum temperature degrades the cooling performance over time. Rheometric temperature control techniques are sometimes used which heat to temperatures above the specified maximum temperatures of Peltier elements. For example, electrical resistance heaters may be used in conjunction with other types of cooling. Liquid or gas coolants may be used with temperature controlled by a separate chiller. Alternatively, liquid nitrogen can be used; however, such systems add significant complexity and cost.

Figure 2:
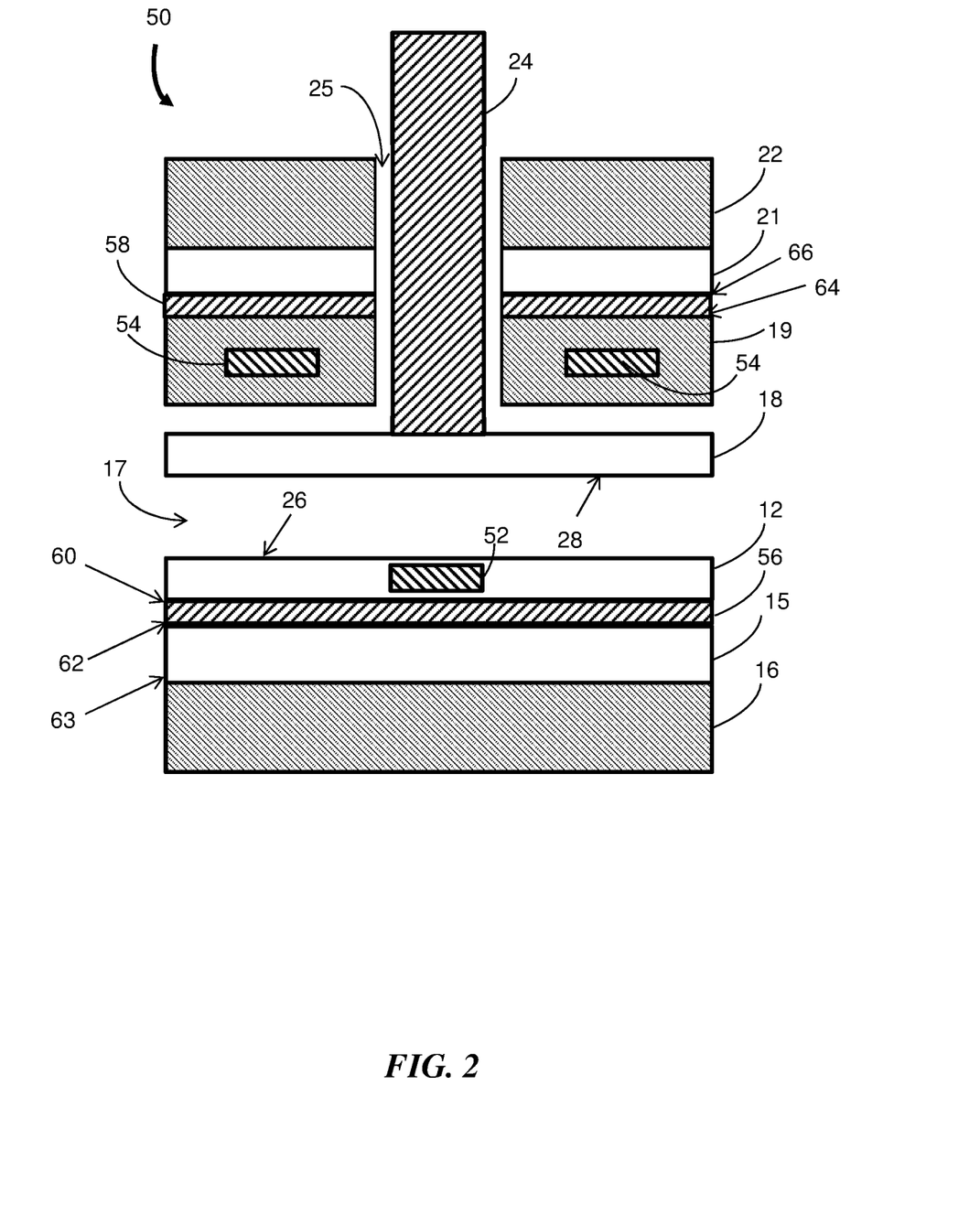
FIG. 2 is a functional block diagram of an example of a rheometer having a higher operating temperature than the rheometer of FIG. 1.

FIG. 2 is a functional block diagram of an example of a rheometer 50 that can be used to achieve a higher operating temperature than that possible using Peltier elements for the heat pumps 14 and 20 for the rheometer of FIG. 1. Reference numbers in the figure that are similar to those in FIG. 1 indicate similar components. Cooling devices 15 and 21 replace the heat pumps 14 and 20 in FIG. 1. The cooling devices 15 and 21 may be Peltier elements configured to operate only in a cooling mode. For example, the cooling devices are configured only for pumping heat in one direction, that is, from the geometries 12 and 18 into their respective heat sinks 16 and 22. The rheometer 50 includes a heater element 52 in thermal contact with the lower geometry 12 and another heater element 54 in thermal contact with the heat conductor element 19. In some implementations, more than one heater element is in thermal contact with lower geometry 12 and/or the heat conductor element 19. By way of a specific example, one or more electrical resistance heaters, such as a cartridge heater, may be used. The heating elements 52 and 54 enable rapid heating of the lower and upper geometries 12 and 18, respectively.

The rheometer 50 further includes a first thermal resistance layer 56 disposed between the lower geometry 12 and lower cooling device 15. A surface of the first thermal resistance layer 56 is in thermal contact with a surface of the lower geometry 12 at their interface 60 and an opposite surface of the first thermal resistance layer 56 is in thermal contact with a cooling surface of the lower cooling device 15 at their interface 62. A second thermal resistance layer 58 is disposed between the heat conductor element 19 and upper cooling device 21. A surface of the second thermal resistance layer 58 is in thermal contact with a surface of the heat conductor element 19 at their interface 64 and an opposite surface of the second thermal resistance layer is in thermal contact with a cooling surface of the upper cooling device 21 at their interface 66. Each thermal resistance layer may be a single layer or may include multiple layers of different thermal conductivity that achieve a total thermal resistance. For example, the thermal resistance layer may include a layer having high thermal conductivity in combination with one or more thermally insulating layers such that the total thermal resistance of the thermal resistance layer is determined by the thermal conductivities and dimensions of all the layers in the combination.

Figure 3:
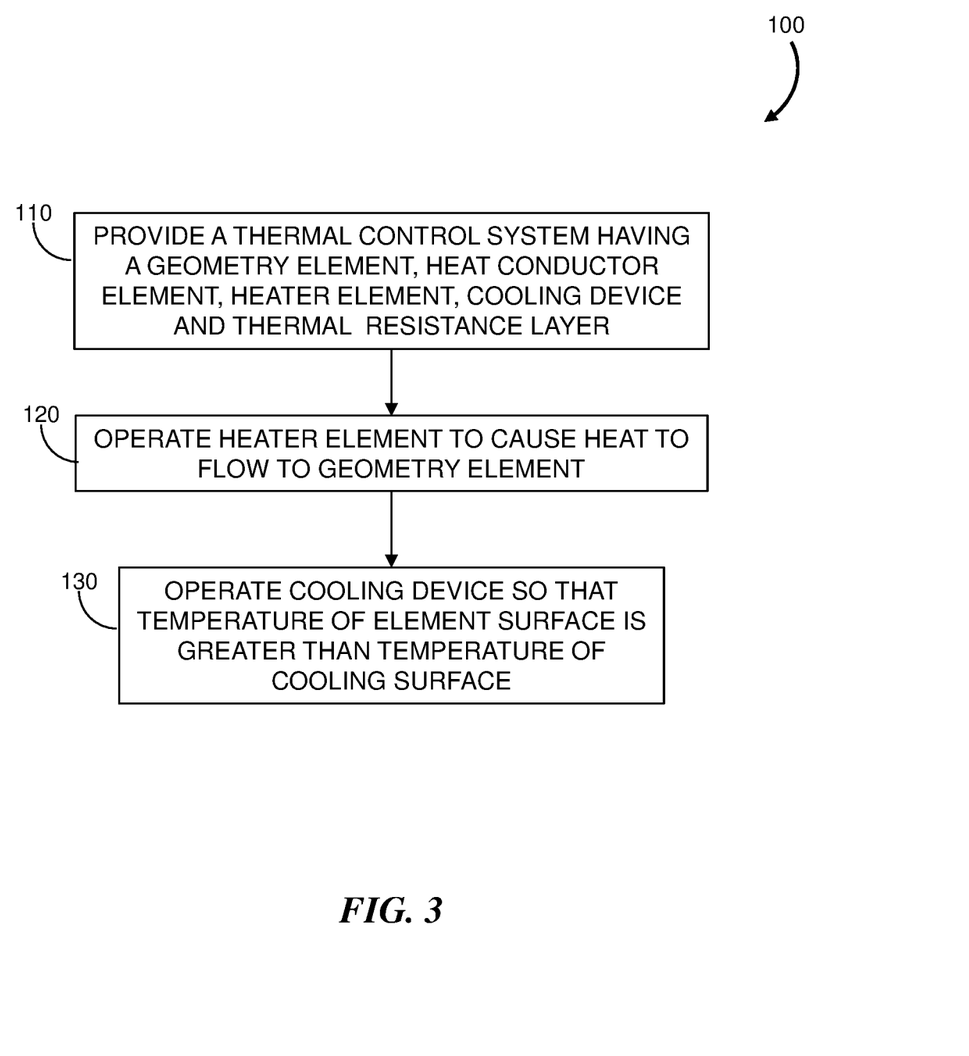
FIG. 3 is a flowchart representation of an example of a method for controlling a sample temperature.

Reference is also made to FIG. 3 which shows an example of a method 100 for controlling a sample temperature using (step 110) a thermal control system that includes some of the components described above with respect to the rheometer 50. The heater elements 52 (or 54) is operated (step 120) to cause heat to flow to the lower geometry element 12. If the temperature of the lower geometry 12 is to be greater than a predetermined temperature, the cooling device 15 is operated (step 130) to draw heat from the lower geometry 12 to the lower heat sink 16. Due to the presence of the thermal resistance layer 56, the temperature of the upper (cooling) surface of the cooling device 15 will be less than the temperature of the lower geometry 12. In one embodiment, the temperature of the cooling surface is prohibited from exceeding a specified maximum temperature. For example, if the cooling device 15 is a Peltier element, the specified maximum temperature may be a temperature that is not to be exceeded so that the device does not experience a degradation of cooling performance over time. Operation of the heat conductor element 19, heating element 54 and cooling device 21 may be similarly controlled according to the method 100.

The thermal resistance of the thermal resistance layers 56 and 58 is selected to protect the Peltier elements from damaging temperatures during heating while reducing or eliminating the degradation to cooling ability. The thermal resistance is based on the thermal resistivity of the layer material and the layer dimensions. Examples of layer materials include polyimides, polyether ether ketones and ceramic materials. By way of a non-limiting example, the thermal resistance of the layers 56 and 58 may be at least 1 K/W and less than or equal to 2 K/W.

The protection of a Peltier element can be achieved if the heat sink is cooled continuously during rheometer heating and cooling operations. During heating, the small thermal resistances of the thermal resistance layers 56 and 58 allow significant heat flow to the Peltier elements and into the heat sink 16 and 22. By drawing substantial power across each thermal resistance layer 56 or 58 at elevated temperatures, a large temperature drop is achieved across the layer 56 or 58. This allows the geometry 12 and heat conductor element 19 to be at a temperature greater that is greater than the temperature of the associated Peltier element surface. If the components are well insulated from ambient conditions, the minimum controllable temperature is nearly the same as that achievable in the absence of the layers 56 and 58.

Figure 4:
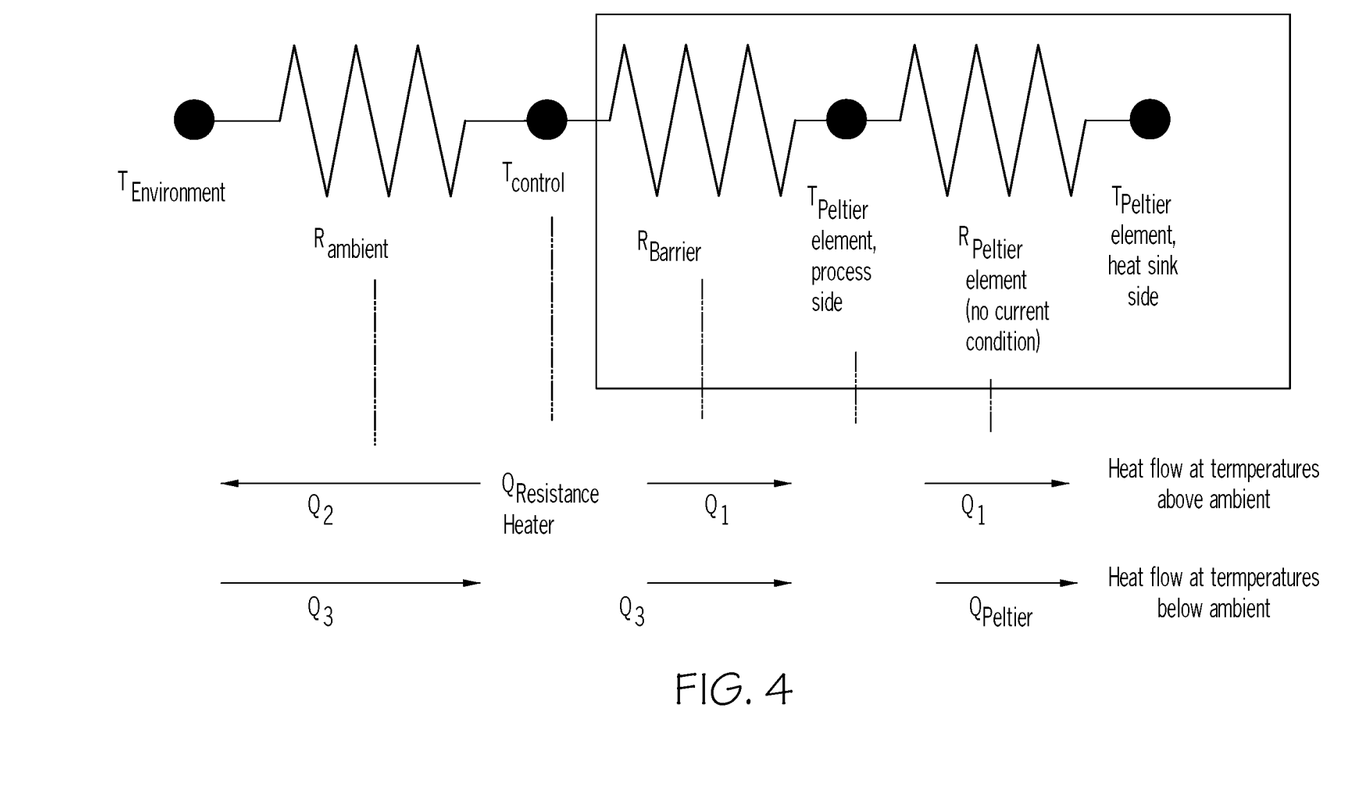
FIG. 4 is a thermal circuit representation of the lower portion of the rheometer of FIG. 2 for an implementation in which the cooling device is a Peltier element.

FIG. 4 shows a thermal circuit representation of the lower portion of the rheometer 50 of FIG. 2 for an implementation in which the cooling device 15 is a Peltier element. Three thermal resistances $R_{ambient}$, $R_{Barrier}$, and $R_{Peltier\ element}$ are shown. $R_{ambient}$ corresponds to the thermal resistance between the ambient environment and the temperature control point (the lower geometry 12 which is in thermal contact with the sample), $R_{Barrier}$ is the thermal resistance across the thermal resistance layer 56 and $R_{Peltier}$ element is the thermal resistance across the Peltier element (with no current applied). Node $T_{Environment}$ represents the temperature of the external environment, node $T_{control}$ represents the controlled temperature of the lower geometry 12, node $T_{Peltier\ element,}$ process side represents the temperature of the Peltier element at its interface 62 with the lower side of the thermal resistance layer 56 and node $T_{Peltier\ element,}$ heat sink side represents the temperature of the Peltier element at its interface 63 with the heat sink 16. The temperature at node $T_{Peltier\ element,}$ heat sink side may be controlled by a fan, coolant circulator and the like. The thermal circuit can be modified for an implementation having a number n of branches of the circuit elements within the box 70 extending from the node $T_{control}$ to account for an embodiment having a number n of Peltier elements each in contact with a corresponding thermal resistance layer.

The heat transfer rates Q for both heating and cooling operations are shown below the thermal circuit. The heat transfer rate $Q_1$ across the thermal resistance layer 56 and cooling device 15 during heating of a sample is given by $$Q_1 = \frac{T_{control} - T_{Peltier\ Element,\ Heat\ Sink\ side}}{R_{barrier} + R_{Peltier\ Element}}$$

and the heat transfer rate across a thermal resistance layer 56 is $Q_3$.

During heating, heat flow from the resistance heaters 52 into the lower geometry 12 and flows out through two distinct paths. One path is through the thermal resistance layer 56 and the Peltier element and the other path is through the instrument thermal insulation to the external environment. During cooling, heat flows from the external environment into the lower geometry 12 across the instrument thermal insulation and heat flows from the lower geometry 12 across the thermal resistance layer 56 and the Peltier element, via the Peltier effect, into the heat sink 16. The heat flows depicted in the figure represent steady state operating conditions above and below ambient temperature; however, heating and cooling can occur temporarily for the purpose of changing temperature. For example, heating can occur momentarily while below ambient temperature and cooling can occur momentarily while above ambient temperature. The heat flow paths for such operation are different from those depicted in the figure.

Using Peltier elements and thermal resistance layers having small thermal resistances compared to the instrument thermal insulation enables the heat transfer rate $Q_1$ to be great enough to create a large temperature difference across the thermal resistance layer 56. For a high instrument thermal insulation with respect to the external environment, the heat transfer rate $Q_3$ during cooling can be maintained at a much lower level so that there is only a small and potentially negligible temperature difference across the thermal insulation layer 56.

The above description of heat flow and heat transfer rates is directed to a single cooling device 15 and thermal resistance layer 56. For two or more cooling devices 15 and corresponding thermal resistance layers 56, the heat transfer rate across each cooling device 15 and thermal resistance layer 56 during heating of a sample is Q1/n and the heat transfer rate across each thermal resistance layer 56 during cooling is Q3/n, where n is the number of cooling devices 15 and corresponding thermal resistance layers 56.

Figure 5A:
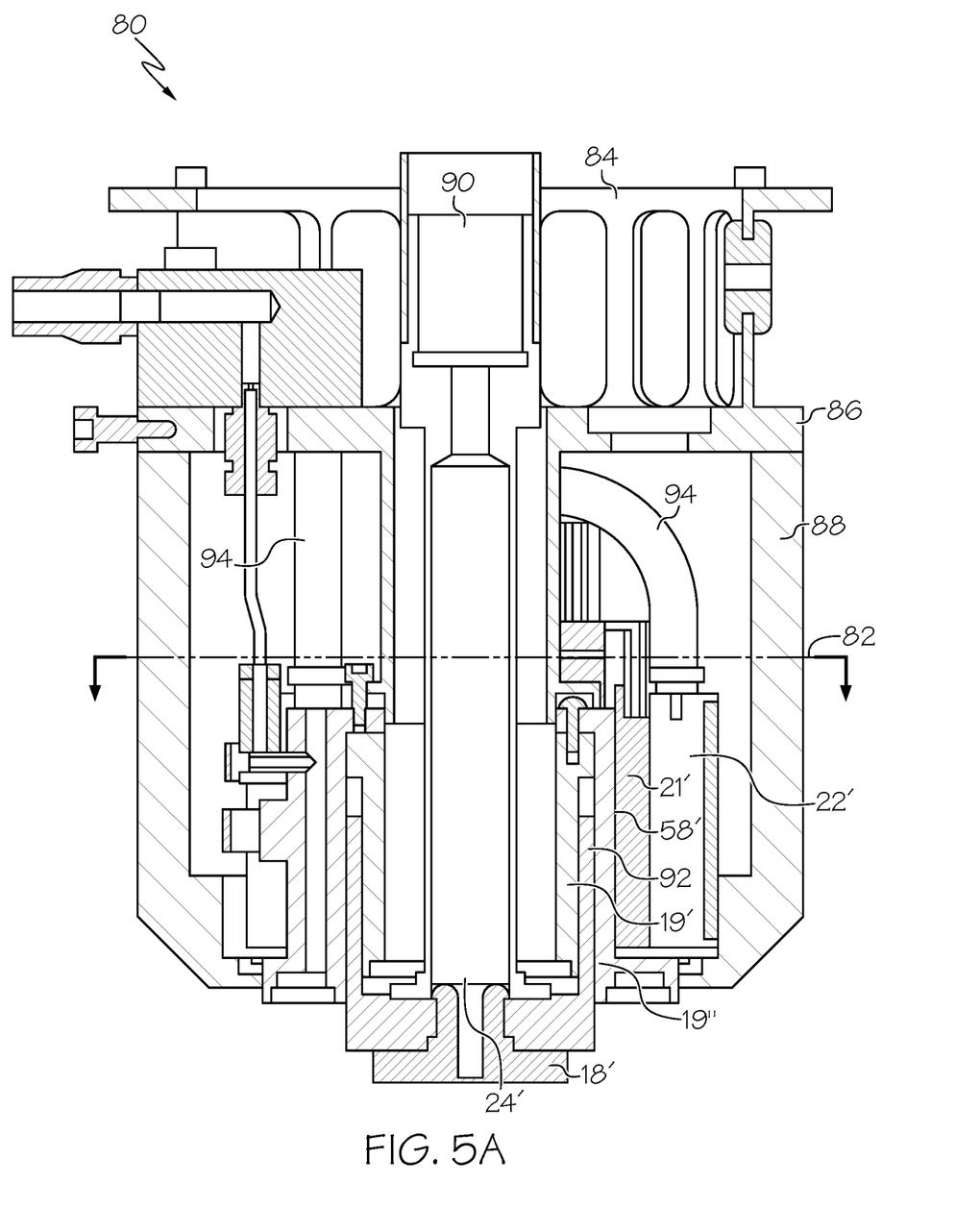
FIG. 5A is a cutaway side view of an embodiment of an upper portion of a rotary rheometer and FIG. 5B is a top down view of the internal components of the upper portion of the rotary rheometer.
Figure 5B:
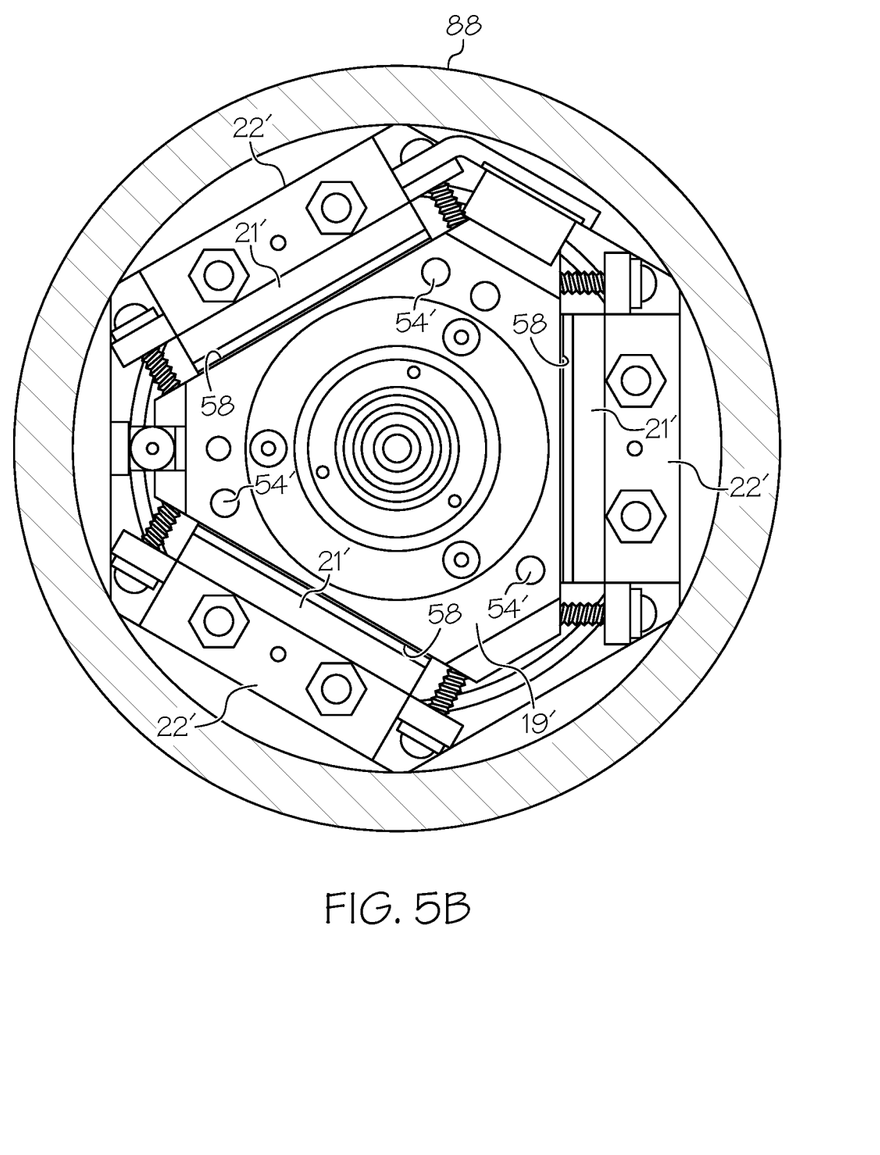

FIG. 5A illustrates a cutaway side view of an embodiment of an upper portion of a rotary rheometer 80 and FIG. 5B illustrates a top down view of the internal components of the upper portion of the rheometer 80 below the dashed line 82. Primed reference numbers refer to elements having similar functionality (but not necessarily similar structure) to elements included in prior figures and identified by unprimed reference numbers. The rheometer 80 includes a mounting structure 84, an upper instrument plate 86 and a housing 88. A rotary shaft 24' extends downward from a rotary motor 90. The upper geometry 18' is in thermal contact with the lower end of the shaft 24' and rotates with the shaft 24' when the motor 90 is activated. A heat spreader element 92 is in direct thermal contact at its lower end with the upper geometry 18'. The heat spreader element 92 extends upward into the space between two cylindrical sections 19' and 19" of a heat conductor element. Three instances of a thermal resistance layer 58', Peltier element 21' and heat sink 22' are positioned along the outer section 19" of the heat conductor element. A coolant conduit 94 is provided to conduct liquid coolant to each heat sink 22'. Electrical resistance cartridge heaters 54' are provided inside the heat conductor element 19'.

Figure 6:
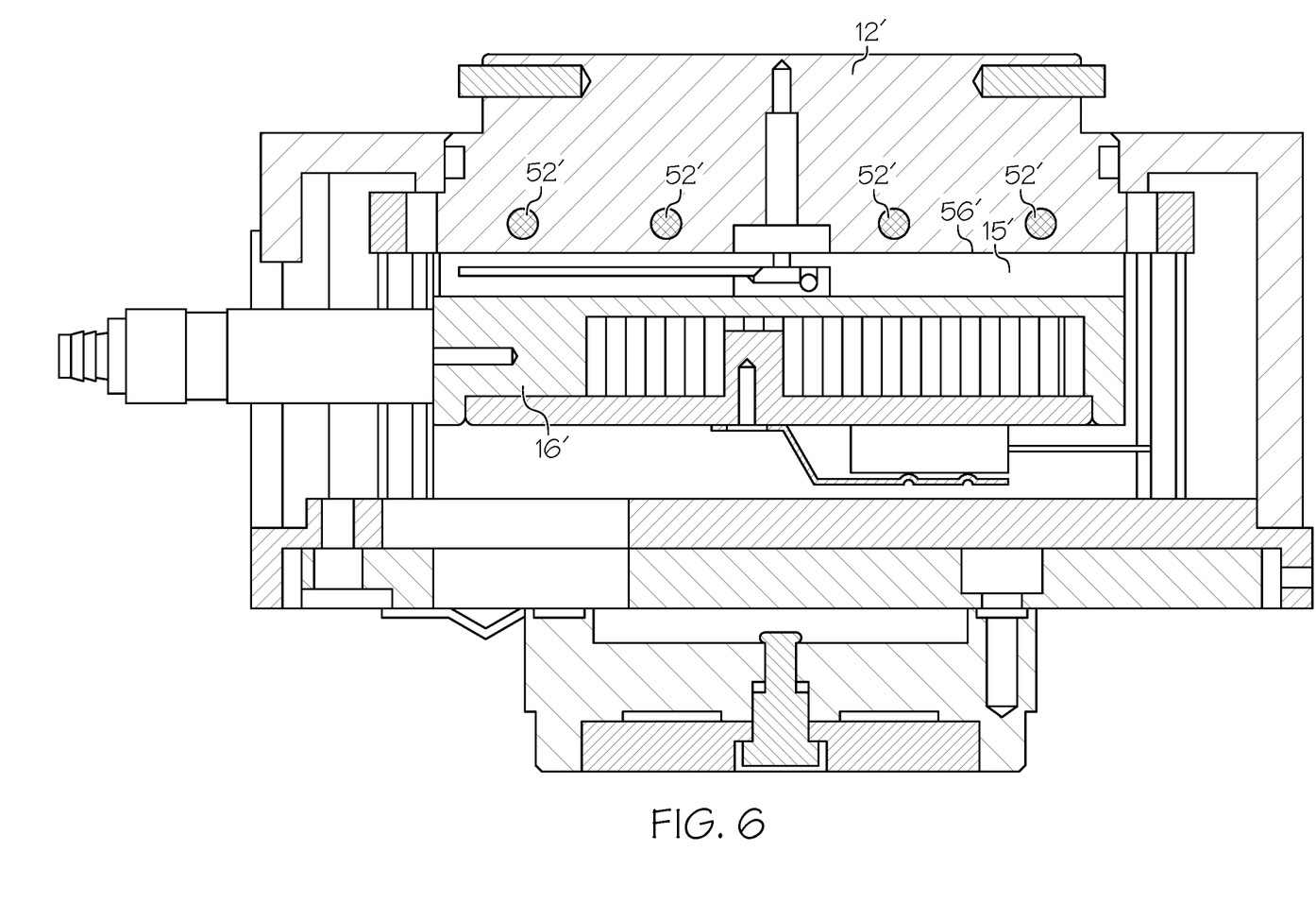
FIG. 6 is a cutaway side view of an embodiment of the lower portion of the rotary rheometer of FIGS. 5A and 5B.

FIG. 6 illustrates a cutaway side view of an embodiment of the lower portion of the rotary rheometer 80 and shows the lower geometry 12' with embedded cartridge heaters 52'. A thermal resistance layer 56' is disposed between the lower surface of the lower geometry 12' and the cooling surface of the Peltier element 15'. A liquid-cooled heat sink 16' is in thermal contact with the lower side of the Peltier element 15'.

Although the devices and methods described above are primarily directed to temperature control of the geometries and/or heat conductor elements of a rheometer, it will be recognized that the devices and methods are applicable to other thermal control systems and techniques. For example, the devices and methods are applicable to a convection oven which surrounds both the lower and upper geometries of a rheometer and, more generally, to any physical arrangement of a temperature-controlled component which supplies heat to and removes heat from a sample.

While the technology has been shown and described with reference to specific embodiments, it should be understood by those skilled in the art that various changes in form and detail may be made therein without departing from the scope of the claims. For example, although embodiments described above are primarily directed to rotary rheometers, it will be appreciated that the disclosed devices and methods can be used with other types of rheometers and various other systems employing temperature control of one or more elements and/or samples.

What is claimed is:

1. A device to control a temperature of a rheometer sample, comprising:
    a geometry element;
    a heat conductor element having an element surface and disposed adjacent to and in thermal communication with the geometry element;
    a heater element in thermal contact with the heat conductor element;
    a cooling device having a cooling surface; and
    a thermal resistance layer disposed between and in thermal contact with the element surface and the cooling surface.

2. The device of claim 1 wherein the cooling device comprises a Peltier element.

3. The device of claim 1 wherein the heat conductor element and the geometry element are a unitary element.

4. The device of claim 1 wherein the geometry element is one of a cup, a bob and a rotor.

5. The device of claim 1 wherein the thermal resistance layer has a thermal resistance of at least 1 K/W and does not exceed 2 K/W.

6. The device of claim 1 wherein the thermal resistance layer comprises one of a polyimide layer, a polyether ether ketone layer and a ceramic layer.

7. The device of claim 1 wherein the heater element comprises an electrical resistance heater.

8. The device of claim 7 wherein the electrical resistance heater comprises a cartridge heater.

9. The device of claim 1 wherein the cooling surface is a first surface of the cooling device, the device further comprising a heat sink having a heat sink surface in thermal contact with a second surface of the cooling device.

10. The device of claim 9 wherein the heat sink is a liquid-cooled heat sink.

11. The device of claim 1 wherein the heat conductor element is disposed around at least a portion of the geometry element.

12. The device of claim 11 wherein the heat conductor element is separated from the geometry element by an air gap.

13. The device of claim 1 wherein the geometry element is a plate configured to be in thermal contact with a rheometer sample.

14. The device of claim 13 wherein the plate is a lower measurement plate of a rheometer.

15. The device of claim 13 wherein the plate is an upper measurement plate of a rheometer.

16. A method for controlling a sample temperature, the method comprising:
    providing a thermal control system comprising:
        a geometry element;
        a heat conductor element having an element surface and disposed adjacent to and in thermal communication with the geometry element;
        a heater element in thermal contact with the heat conductor element;
        a cooling device having a cooling surface; and
        a thermal resistance layer disposed between and in thermal contact with the element surface and the cooling surface;
    operating the heater element to cause heat to flow to the geometry element; and
    operating the cooling device to cool the cooling surface to a temperature that is less than a temperature of the element surface.

17. The method of claim 16 wherein the temperature of the element surface is greater than a specified maximum temperature of the cooling surface.

18. The method of claim 16 wherein the thermal resistance layer has a thermal resistance of at least 1 K/W and does not exceed 2 K/W.

19. The method of claim 16 wherein the cooling device comprises a Peltier element.

20. The method of claim 16 wherein operating the cooling device to cool the cooling surface comprises cooling the cooling surface to a temperature that does not exceed a specified maximum temperature of the cooling surface.

* * * * *